United States Patent
Dobler et al.

[11] Patent Number: 6,036,341
[45] Date of Patent: Mar. 14, 2000

[54] HEADLIGHT FOR VEHICLE

[75] Inventors: Karl-Otto Dobler, Reutlingen; Gustav Klett, Wankheim, both of Germany

[73] Assignee: Robert Bosch GmbH, Stuttgart, Germany

[21] Appl. No.: 09/010,347

[22] Filed: Jan. 22, 1998

[30] Foreign Application Priority Data

Mar. 15, 1997 [DE] Germany .............................. 197 10 857

[51] Int. Cl.$^7$ ................................................... B60Q 1/06
[52] U.S. Cl. ............................................ 362/524; 362/528
[58] Field of Search .................................. 362/514, 515, 362/523, 524, 528

[56] References Cited

U.S. PATENT DOCUMENTS

| 5,642,935 | 7/1997 | Schmitt | 362/528 |
| 5,647,659 | 7/1997 | Mori | 362/524 |

FOREIGN PATENT DOCUMENTS 35 15 150 A1   10/1986   Germany .

Primary Examiner—Stephen Husar
Attorney, Agent, or Firm—Michael J. Striker

[57] ABSTRACT

A headlight for a vehicle, has a holder, at least one reflector displaceably supported on the holder, a displacing device for displacing the reflector and having a displacement screw which is turnable on the holder about a longitudinal axis of the displacement screw but is non displaceable in a direction of the longitudinal axis, the displacing device also having a deviating transmission with a receptacle which is mountable on the holder, an adjusting element supported on the receptacle non rotatably about a longitudinal axis of the adjusting element but non displaceable in a direction of the longitudinal axis of the adjusting element, the adjusting element engaging with the displacement screw, the deviating transmission being formed as a bevel gear transmission, the displacement screw being provided with a first bevel toothing while the adjusting element being formed as a bevel gear provided with a second bevel toothing and the receptacle being mounted on the housing transversely to the longitudinal axis of the displacement screw.

12 Claims, 3 Drawing Sheets

HEADLIGHT FOR VEHICLE

BACKGROUND OF THE INVENTION

The present invention relates to a headlight for vehicle.

Headlights for vehicles are known in the art. One of such headlights is disclosed for example in the German patent document DE 35 15 150 A1. This headlight has a holder on which a reflector is arranged adjustably. An adjusting device is provided for adjusting of the reflector and has an adjusting screw which is turnable on the holder around its longitudinal axis, but is held non displaceably in direction of its longitudinal axis and extends with its head outside of the holder. A further part of the adjusting device is a receptacle which is mountable on the holder by an arresting connection and in which an angular transmission is arranged. The angular transmission has an adjusting element formed as a screw wheel which is rotatable on the receptacle on its longitudinal axis but is supported non-displaceably in direction of its longitudinal axis. The angular transmission also has a further sleeve shaped screw wheel which is supported on the receptacle and engages with the screw wheel serving as an adjustment element. Two springy arresting arms extend from the holder in direction from the longitudinal axis of the adjusting screw. The receptacle is insertable between them and the arresting arms engage with the projections over the receptacle. During mounting of the receptacle, the head of the adjusting screw is guided into the sleeve shaped screw wheel, and thereby the adjusting screw is coupled with its screw wheel in the rotary direction around its longitudinal axis. Due to the angular transmission, an actuation of the adjusting screw is possible also when it is not directly accessible on the reflector which is built in the vehicle. The screw wheel serves as the adjusting element can be arranged so that it is accessible with a tool on the headlight built in on the vehicle. This headlight has the disadvantage that the device has many components, whereby the mounting and manufacture of the headlight is expensive. Moreover, the manufacture of the holder by the arresting arms arranged on it is difficult, since for this purpose it is necessary to provide for injection molding of holder an injection molding tool with movable sliders to form projections of the arresting arms which provide undercuts relative to the mold opening direction of the holder.

SUMMARY OF THE INVENTION

Accordingly, it is an object of present invention to provide a headlight for a vehicle which avoids the disadvantages of the prior art.

In keeping with these objects and with others which will become apparent hereinafter, one feature of present invention resides, briefly stated, in a headlight for a vehicle in which a deviating transmission is formed as a bevel gear transmission, a bevel toothing is formed on the adjusting screw, and a regulating element is formed as a bevel gear provided with a second bevel toothing, while the receptacle is mountable on the housing transversely to the longitudinal axis of the adjusting screw.

When the headlight for the vehicle is designed in accordance with present invention, it needs only a few components for the adjusting device, mainly the adjusting screw, the receptacle and the bevel gear, so that the manufacture mounting of the headlight is simplified.

In accordance with another feature of present invention the holder has a projection which surrounds the adjusting screw at least in the region of its bevel toothing on at least one part of its periphery and the projection in its periphery has at least one opening through which the bevel gear passes, while the receptacle is mountable on the projection. This construction allows a simple arrangement of the receptacle on the holder.

In accordance with still a further feature of present invention, the opening is open in direction of the longitudinal axis of the adjusting screw away from the holder. With this construction, the manufacture of the opening can be performed during the manufacture of the holder by injection molding without an injection molding tool with movable slider.

In accordance with still another feature of present invention, the bevel gear has a circumferential angular groove and a receptacle has a recess in which the bevel gear is insertable with its ring groove, while the edge of the recess is springy expandable so that the bevel gear is held arrestingly in the recess. This construction permits a simple premounting of the bevel gear on the receptacle.

The adjusting screw can be provided with a circumferential ring groove and the receptacle can have a portion with the recess insertable in the ring groove, whereby the receptacle is fixed in direction of the longitudinal axis of the adjusting screw. This allows a simple fixation of the receptacle in direction of the longitudinal axis of the adjusting screw without a special construction for the holder.

The bevel gear in a built-in position of the receptacle can be arranged on the holder with its longitudinal axis inclined relative to the longitudinal axis of the adjusting screw at an angle deviating from 90°. This enables an actuation of the bevel gear in narrow mounting conditions of the headlight of the vehicle, in which an accessibility perpendicular to the longitudinal axis of the adjusting screw is not possible.

Finally, at least one guiding element can be arranged on the holder, through which a tool for turning the bevel gear is placeable. Therefore, when the bevel gear is not visible on the headlight built in the hedlight, a tool for actuation of the bevel gear can be set.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
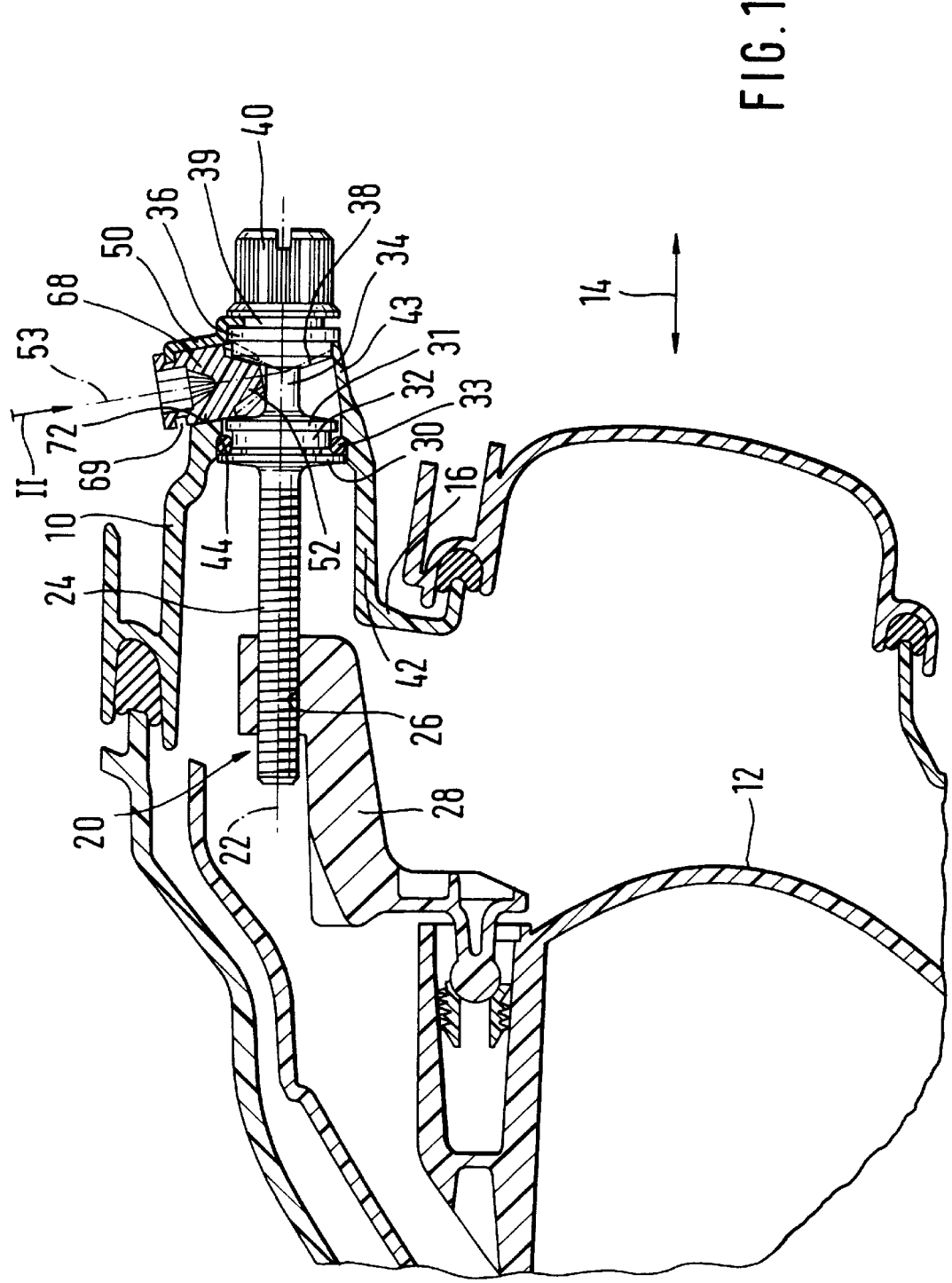
FIG. 1 is a view showing a headlight in a vertical longitudinal section with an adjusting device.

A headlight for vehicles, in particular motor vehicles, shown in FIGS. 1–4 has a holder 10 formed as a housing. The holder 10 can be alternatively formed as an open supporting frame. In the housing 10, as shown in FIG. 1, at least one reflector 12 is arranged. It is supported displaceably on the housing 10 through several bearing points, and at least one not shown light source is inserted in the reflector.

The displacability of the reflector 12 is provided for adjustment of the orientation of the light bundle reflected from it. The reflector 12 is turnable about a horizontal and/or vertical axis. For displacement of the reflector 12, at least one displacing device is provided. It engages the reflector eccentrically to the turning axis of the reflector. For adjusting the reflector 12 about a horizontal axis and a vertical axis, correspondingly two displacing devices are provided.

The housing 10 is composed preferably of synthetic plastic material and produced by injection molding. The housing 10 for this purpose is removed from the injection molding device in the arrow direction in FIG. 1. For producing the regions of the housing 10 which form undercuts as considered in the mold opening direction 14, the movable slider must be provided in the injection molding 2, which during the mold opening must move the housing 10 from the injection mold, since otherwise removal of the housing 10 from the mold is not possible. Such movable sliders lead to the situation that the injection molding 2 are produced expensively and therefore are very costly.

Hereinbelow, an example of a displacing of the headlight is described, which can be provided with many units on the reflector. The displacing device, as shown in FIG. 1, has an adjusting screw 20 which is arranged on the housing 10 rotatably about its longitudinal action 22 but not displacably in direction of its longitudinal axis. The displacing screw 20 can be supported in an opening of rear wall 16 of the housing 10. The displacing screw 10 has a threaded shaft 24 arranged on the housing 10. A transmitting element 28 is screwed on it and provided with a threaded opening 26. The transmitting element is hingedly connected with the reflector 12 and is displaceable in the housing 10 in direction of the longitudinal axis 22 of a displacing screw 20, however is non rotatable around its longitudinal axis.

The displacing screw 20 is provided on its threaded shaft 24 with two collars 30 and 31 arranged at a distance in direction of the longitudinal axis 22 from one another. They have an increase diameter, and a circumferential ring groove 32 is formed between the collars. An elastically deformable sealing element 33 formed as an O-ring is inserted in the ring groove. The collar 30 which faces the threaded shaft 24 has a substantially greater diameter than the other collar 31. On the collar 31 the displacing screw 20 has subsequently a portion 34 with a smaller diameter, and a collar 36 with an increase diameter follows the same. A bevel toothing 38 is formed on the collar 38 at the portion 34. A circumferential ring groove 39 is formed in the collar 36, and a head of the displacing screw 20 follows the same away from the portion 34. The displacing screw 20 is composed preferably of a synthetic plastic material, and the above described regions are formed of one piece on the displacing screw 20. A projection 42 extends from the rear wall 16 of the housing 10, and an opening is formed in the projection. The displacing screw 20 extends through the opening. The projection 22 surrounds the displacing screw 20 at least on a part of its periphery and it is provided on its end region facing away from the housing 10 with one or several springy arresting arms 43. They are movable transversely to the longitudinal axis 22 of the displacing screw 20.

At the side facing the interior of the housing 10, the projection 42 has a substantially increased inner diameter, so that there a step 44 directed to the interior of the housing 10 is formed. During the mounting, the displacing screw 20 is inserted from the interior of the housing 10 into the projection 42 with its end 40 and outwardly. The head 40 passes between the arresting arms 43 and extends outwardly of the housing 10. The region of the displacing screw 20 with the O-ring 33 dips in the portion of the projection 32 with the increase inner diameter, and in the end position of the displacing screw 20 the O-ring 33 is located on the step 44 and supported on the collar 33. During passage of the collar 33 between the arresting arms 43, their pressed springy outwardly, and in the end position of the displacing screw 20, the arresting arms 43 engage inwardly behind the collar 36. The displacing screw 20 is then held non-displaceably by the arresting arms 43 and O-ring 33 supported through the collar 30 on the housing 10, in direction of its longitudinal axis. However, it is rotatable around its longitudinal axis 22. A sealing of the housing 10 is guaranteed by the O-ring 33 during passage of the displacing screw 20. In its built-in position of the housing 10, the displacing screw 20 is arranged so that its longitudinal axis 22 is arranged at least approximately parallel to mold opening direction 14 of the housing 10.

The head 40 of the displacing screw 20 can be formed for example as a hexagon. Alternatively or additionally, the head can have also a transverse slot or a cross-shaped slot and/or a depression in form of an inner hexagon. With this shape, it is possible to engage it with a corresponding tool for turning of the displacement screw 20.

Figure 2:
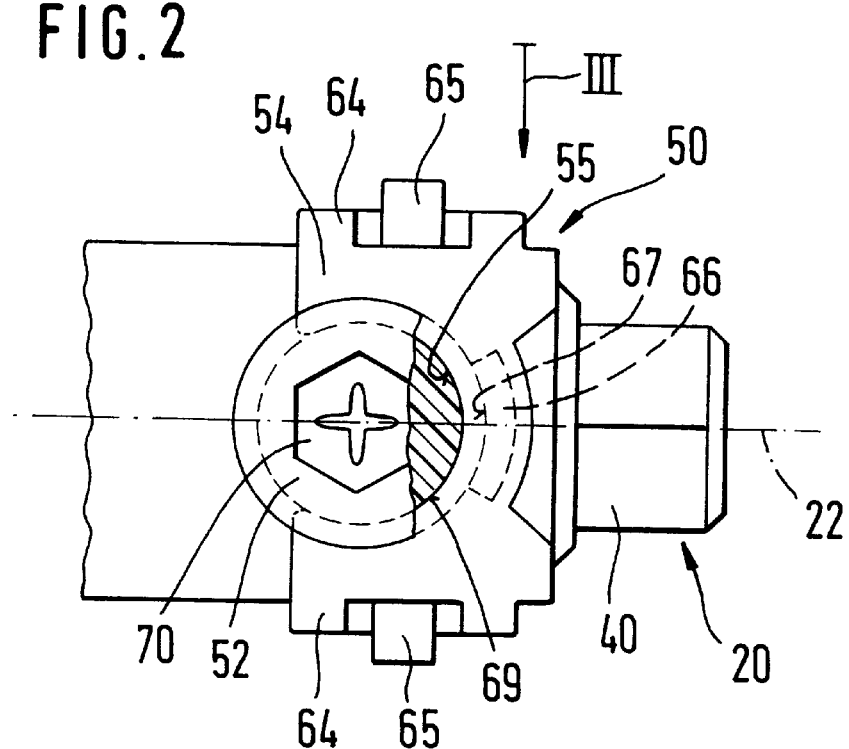
FIG. 2 is a view showing the adjusting device in view in direction of the arrow II in FIG. 1.

The displacing device also has a deviating transmission mounted on the housing 10. Therefore, an actuation of the displacing screw 20 is possible also when the headlight built-in the vehicle is not directly accessible. The deviating transmission has a receptacle on which a bevel gear 52 is rotatable about its longitudinal axis 53, but is not displaceable in direction of its longitudinal axis. A receptacle 50 has, as shown in FIG. 2, a first support 54 with a first support U-shaped receptacle 55. The support 54 in the built-in position of the receptacle 50 is arranged on the housing 10 so that the open side of the receptacle 52 faces in direction toward the longitudinal axis 22 of the displacing screw 20. Preferably, the receptacle 55 at its open side is somewhat narrowed relative to its greatest diameter, and the support 54 is elastically deformable so that the receptacle 55 is springy expandable. The receptacle 50 also has a second support 58 shown in FIGS. 3 and 4. It is arranged at an angle β relative to the first support 54, which amounts to approximately 90°, but also can be greater than 90°, or as shown in FIG. 2 can be smaller than 90°. The second support 58 has, as shown in FIG. 4, a second U-shaped receptacle 60. The support 58 in the built-in position of the receptacle 50 is arranged on the housing 10 at least approximately perpendicular to the longitudinal axis 22 of the displacing screw 20, and the receptacle 60 is directed with its open side perpendicular to the longitudinal axis 22. The both supports 54, 58, as shown in FIG. 3, are connected of one piece with one another to form an angular piece 62, and the receptaclees 55 and 60 face away from the angular piece 62 with their open sides.

Figure 3:
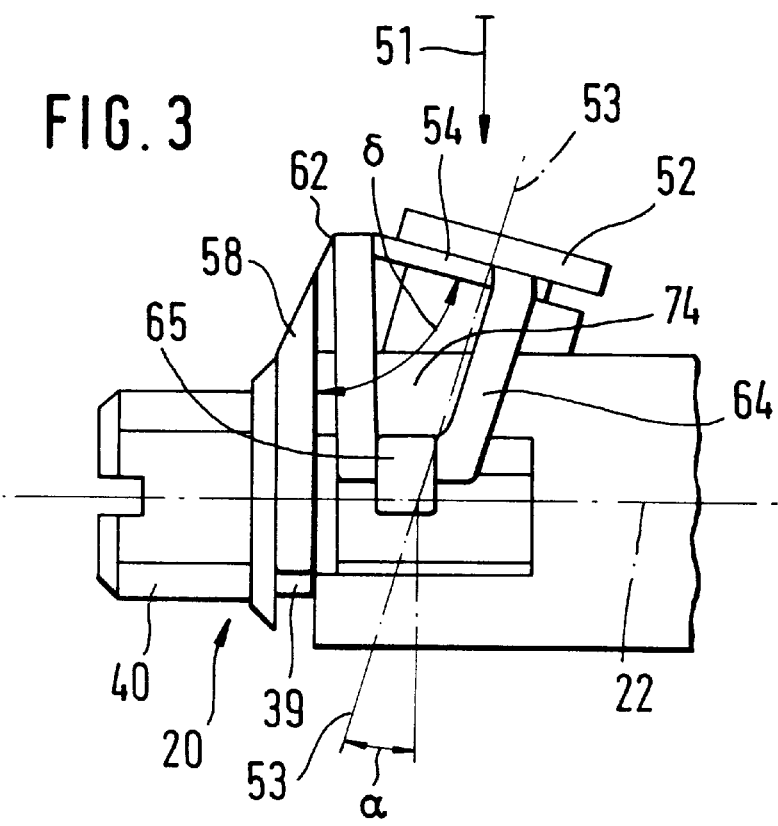
FIG. 3 is a view showing the adjusting device in direction of the arrow III in FIG. 1.
Figure 4:
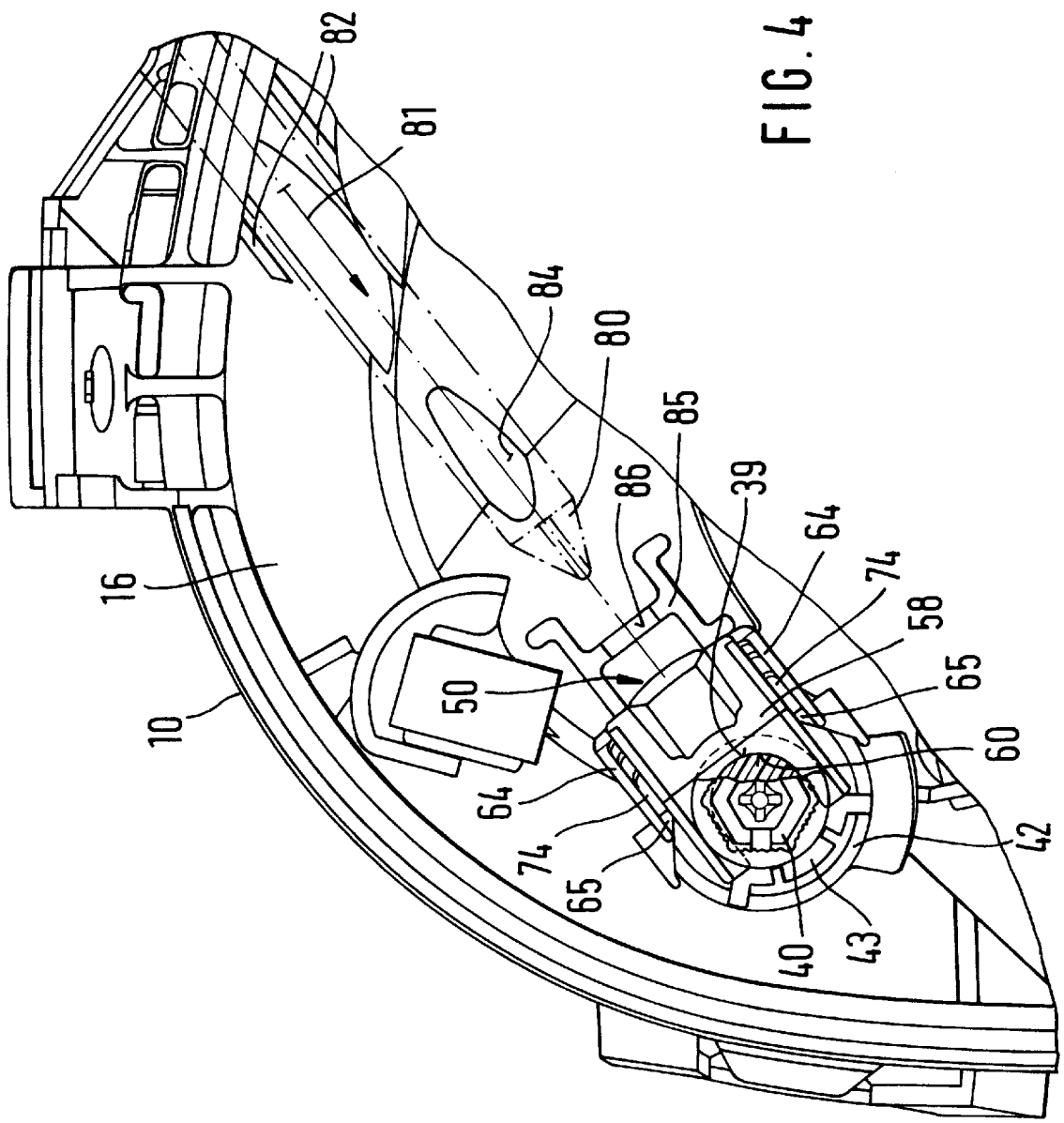
FIG. 4 is a view showing a headlight which is partially sectioned with the adjusting device on a rear view.

As can be seen from FIGS. 2–4, two springy arresting arms project from the first support 54 on the receptacle 55. They each have two legs which are formed of one piece with their one ends on the support 54. At their other ends which are spaced from the support 52, the legs connect correspondingly an arresting arm 54, as shown in FIG. 3, in a U-shaped manner with one another and form their an arresting hook 65. The arresting hook 65 of the arresting arms 64 are inclined at their facing sides, as shown in FIG. 4, so that they approach one another toward the support 54, while their sides facing away from the support 54 extend substantially parallel tot he support 54.

A console 66 can be arranged on the second carrier 58, as shown in FIG. 2, at its inner side facing the first support 54 near the second receptacle 60. The console has a cylindrical depression 67 which is approximately coaxial to the first receptacle 55. The receptacle 50 is composed preferably of synthetic plastic material and is produced by injection molding, so that all illustrated parts can be formed of one piece with one another.

The bevel gear 52 can be composed of metal or synthetic plastic material and has in its region a cylindrical shaft 68 connected with the bevel gearing, as shown in FIG. 1. A circumferential ring groove 69 is formed in the shaft 68. The receptacle 60 is pre-mountable with the bevel gear 52 as a structural unit, and the bevel gear 52 is inserted in the first receptacle 55 of the first support 54 from its open side. The edge of the receptacle 55 extend into the ring groove 69 of the bevel gear 52, and the receptacle 55 is somewhat springy expanded as explained above, until the bevel gear 52 is inserted with its greater diameter in the receptacle 55. After this, the receptacle 55 springs again back and the bevel gear 52 is arrestingly held in the receptacle 55. The bevel gear 52 is rotatable in the receptacle 55 about its longitudinal axis 53, but held non displaceably by the receptacle 55 engaging in the ring groove 69 in direction of its longitudinal axis 53. At its end which is opposite to its toothing, the bevel gear 52 has a receptacle provided for placing a tool as can be seen from FIGS. 1 and 2. This receptacle can be formed for example as a depression 70 with an inner hexagon, as a transverse slot, a cross-shaped slot, or an outer hexagon, or in combination of these shapes.

The projection 42 extending from the housing 10 has an opening 72 provided at least at one location of its circumference in the region of the bevel toothing 75 of the displacement screw 20. The opening 74 can be formed so that it does not extend to the end of the projection 42 which faces away from the housing 10 or in other words formed close. Preferably, the opening 72 is formed so that it is open at the end of the projection 42 which faces away from the housing 10. No undercutting is provided for the opening 72 in the mold opening direction 14 of the housing 10, so that the manufacture of the opening 72 by injection molding of the housing 10 in an injection molding device is possible without a movable slide. A strip 74 is arranged on the projection 42 or around it on the periphery near the opening 72 as shown in FIGS. 3 and 4. The strip 72 extends perferably parallel to the mold opening direction 14 of the housing 10.

During mounting of the receptacle 50 with the bevel gear 52 pre-mounted in it on the housing 10, it is placed transversely to the longitudinal axis 22 of the displacement screw 20 in direction of the arrow 21 as shown in FIG. 3. The bevel gear 52 extends with its toothing through the opening 72 of the projection 42 and reaches an engagement with the toothing 38 of the adjusting screw 20. The bevel gear 52 is arranged so that its longitudinal axis 53 intersects the longitudinal axis 22 of the adjusting screw 20. The arresting hooks 65 of the arresting arms 64 slide during mounting of the receptacle 52 with its inclined sides on the strips 74 as shown in FIG. 4. The arresting arms 64 are pressed in a springy fashion from one another. In the end position of the receptacle 50 the arresting hooks 65 engage behind the strip 74 and the arresting arms 64 move springy again inwardly, so that the receptacle 50 is fixed transversely to the longitudinal axis 52 of the adjusting screw 20 on the housing 10. The second support 58 of the receptacle 50 is arranged in the region of the ring groove 39 of the adjusting screw 20 as shown in FIGS. 3 and 4. The displacement screw 20 is inserted with its ring groove 39 in the receptacle 60.

In the end position of the receptacle 50 the adjustment screw 20 is located with its ring groove 39 on the edge of the receptacle 60 and the receptacle 50 is fixed non displaceably in direction of the longitudinal axis 22 of the displacement screw 20. The bevel gear 52, as shown in FIG. 1, is fixed rotatably between the edge of the opening 72 of the projection 42 facing the housing 10 and the edge of the recess 55 of the receptacle 50 facing away from the housing 10, as well as through its shaft 68 in the depression 67 of the console 66 of the receptacle 50.

For actuation of the adjustment screw 10, a tool 8 shown in FIG. 4 can engage the bevel gear 52 and turn it, and this turning movement is transmitted to the adjustment screw 20. One or several guiding elements can be arranged on the housing 10 so that the tool, without seeing the bevel gear 52, can be reliably guided in the placing direction 81 to the receptacle for the tool on the bevel gear 52. The guiding elements can be formed as walls 82 arranged at a distance from one another. The walls project of one piece from the outer side of the housing 10 and extend parallel to the placing direction 81 of the tool 80. Alternatively, the guiding elements can be also formed as depressions 84 worked in the outer side of the housing 10 and extending parallel to the placing direction 81 of the tool 80. Furthermore, alternatively, the guiding elements can be formed as depressions 86 which are formed in consoles 85 projecting from the outer side of the housing 10. They extend parallel to the placing direction 81 of the tool 80. Also, a combination of different guiding elements in accordance with the above described embodiments is possible as well.

The opening 72 of the projection 42 of the housing 10 can be arranged at any location on the periphery of the displacement screw 20 and the strips 74 can be arranged correspondingly laterally near the opening 72. Thereby the engaging point for the tool 80 can be selected in a simple way in dependence on the mounting conditions of the headlight on the vehicle, so that the bevel gear 52 is accessible for its rotation by the tool 80. The bevel gear 52 must be arranged with its longitudinal axis 53 not perpendicular to the longitudinal axis 22 of the displacement screw 20 but instead it can be arranged with its longitudinal axis 53 at an angle $\alpha$ to the longitudinal axis 22 which deviates from 90°. This is provided by the above described arrangement of the first support 54 of the receptacle 50 at an angle $\beta$ which is different from 90° relative to the second support 58 of the receptacle 50 engaging in the ring grove 39 of the adjusting screw 20. The angle $\alpha$ is related therefore to the angle $\beta$ in accordance with the following equation $\alpha = 90° - \beta$. Because of this inclined arrangement of the bevel gear 52 relative to the longitudinal axis 22 of the displacement screw 20, it is possible to execute an actuation of the bevel gear 52 in such mounting conditions of the headlight on the vehicle, with which no placing of the tool 90 perpendicular to the longitudinal axis 32 is possible.

The above described receptacle 50 with the bevel gear 52 arranged on it can be used for different displacing devices on a headlight. Also, it can be also used for different headlights which must be only provided with the corresponding projection 42, and the opening 42 can be arranged at any location of the periphery of the projection 42. Thereby the manufacturing expenses of various headlights can be reduced with the use of such a receptacle 50.

It will be understood that each of the elements described above, or two or more together, may also find a useful application in other types of constructions differing from the types described above.

While the invention has been illustrated and described as embodied in headlight for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a vehicle, comprising a holder; at least one reflector displaceably supported on said holder; a displacing device for displacing said reflector and having a displacement screw which is turnable on said holder about a longitudinal axis of said displacement screw but is non displaceable in a direction of said longitudinal axis, said displacing device also having a deviating transmission with a receptacle which is mountable on said holder and with an adjusting element supported on said receptacle non rotatably about a longitudinal axis of said adjusting element but non displaceable in a direction of said longitudinal axis of said adjusting element, said adjusting element engaging with said displacement screw, said deviating transmission also including a bevel gear transmission, said displacement screw being provided with a first bevel toothing while said adjusting element being formed as a bevel gear provided with a second bevel toothing so that said first and second bevel toothings form said bevel gear transmission, said receptacle being mounted on said holder transversely to said longitudinal axis of said displacement screw.

2. A headlight as defined in claim 1, wherein said holder has a projection which surrounds said displacement screw at least in a region of said first bevel toothing over at least a part of its circumference, said projection on its periphery being provided with at least one opening through which said bevel gear passes, and said receptacle being mounted on said projection.

3. A headlight as defined in claim 1, wherein said bevel gear has a circumferential groove and said receptacle has a recess in which said bevel gear is insertable with said ring groove, said recess having an edge which is springy expandable, so that said bevel gear can be arrestingly held in said recess.

4. A headlight as defined in claim 1, wherein said adjustment screw has a circumferential ring groove and said receptacle has a portion provided with a further receptacle inserted in said ring groove, said first mentioned receptacle being fixed in a direction of said longitudinal axis of said displacement screw.

5. A headlight as defined in claim 1, wherein said receptacle has at least one springy arresting arm which is arrestable on said holder tranversely to said longitudinal axis of said displacement screw.

6. A headlight as defined in claim 1, wherein said bevel gear in a mounted position of said receptacle on said holder is arranged so that said longitudinal axis of said adjusting element is inclined relative to said longitudinal axis of said displacement screw at an angle which is different from 90°.

7. A headlight as defined in claim 1; and further comprising at least one guiding element arranged on said holder so that with said guiding element a tool for turning said bevel gear can be placed to be guided in a placing direction toward said bevel gear.

8. A headlight as defined in claim 1, wherein said holder is formed as an element which is producable by injection molding in an injection molding device, said displacement screw with said longitudinal axis of said displacement being arranged approximately parallel to a mold opening direction of said holder from an injection molding device used for its manufacture.

9. A headlight as defined in claim 1; and further comprising an arresting connection with which said deviating transmission with said receptacle is mounted on said holder.

10. A headlight for a vehicle, comprising a holder; at least one reflector displaceably supported on said holder; a displacing device for displacing said reflector and having a displacement screw which is turnable on said holder about a longitudinal axis of said displacement screw but is non displaceable in a direction of said longitudinal axis, said displacing device also having a deviating transmission with a receptacle which is mountable on said holder and with an adjusting element supported on said receptacle non rotatably about a longitudinal axis of said adjusting element but non displaceable in a direction of said longitudinal axis of said adjusting element, said adjusting element engaging with said displacement screw, said deviating transmission also including a bevel gear transmission, said displacement screw being provided with a first bevel toothing while said adjusting element being formed as a bevel gear provided with a second bevel toothing so that said first and second bevel toothings form said bevel gear transmission, said receptacle being mounted on said holder transversely to said longitudinal axis of said displacement screw, said holder having a projection which surrounds said displacement screw at least in a region of said first bevel toothing over at least a part of its circumference, said projection on its periphery being provided with at least one opening through which said bevel gear passes, and said receptacle being mounted on said projection.

11. A headlight as defined in claim 10, wherein said opening is open in a direction of said longitudinal axis of said displacement screw away from said holder.

12. A headlight as defined in claim 10, wherein said bevel gear is premounted on said receptacle and in a mounted position of said receptacle on said holder and is supported between said receptacle and an edge of said opening rotatably about said longitudinal axis of said adjusting element.

* * * * *